United States Patent
Chen et al.

(10) Patent No.: US 8,223,487 B2
(45) Date of Patent: Jul. 17, 2012

(54) ELECTRONIC DEVICE

(75) Inventors: Wei-Renn Chen, Taipei (TW);
Tsan-Wei Liu, Taipei (TW); Yu-Ching Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 197 days.

(21) Appl. No.: 12/750,719

(22) Filed: Mar. 31, 2010

(65) Prior Publication Data
US 2011/0182015 A1    Jul. 28, 2011

(30) Foreign Application Priority Data
Jan. 26, 2010    (TW) .............................. 99102096 A (51) Int. Cl.
*G06F 1/16* (2006.01)
(52) U.S. Cl. .................... 361/679.57; 362/85; 345/65
(58) Field of Classification Search .............. 361/679.09
See application file for complete search history.

(56) References Cited

U.S. PATENT DOCUMENTS

| | | | |
|---|---|---|---|
| 5,815,225 A * | 9/1998 | Nelson ............................. | 349/65 |
| 6,561,668 B2 | 5/2003 | Katayama et al. | |
| 6,598,999 B2 * | 7/2003 | Horiuchi et al. ............... | 362/335 |
| 6,776,497 B1 * | 8/2004 | Huppi et al. ..................... | 362/85 |
| 6,834,975 B2 * | 12/2004 | Chu-Chia et al. ............... | 362/84 |
| 7,090,368 B2 * | 8/2006 | Oross et al. ...................... | 362/84 |
| 7,126,816 B2 * | 10/2006 | Krah .......................... | 361/679.55 |
| 7,695,149 B2 * | 4/2010 | Yukawa et al. ................. | 362/26 |
| 7,717,607 B2 * | 5/2010 | Harris et al. ................... | 362/633 |
| 7,794,113 B2 * | 9/2010 | Lee ................. | 362/274 |
| 8,021,022 B2 * | 9/2011 | Ling et al. ...................... | 362/274 |
| 8,031,463 B2 * | 10/2011 | Yukawa et al. .......... | 361/679.21 |
| 8,035,481 B2 * | 10/2011 | Krah ............................ | 340/7.58 |
| 2007/0253182 A1 * | 11/2007 | Motai et al. ...................... | 362/23 |
| 2008/0266865 A1 * | 10/2008 | Lev et al. ....................... | 362/287 |
| 2011/0128719 A1 * | 6/2011 | Tracy et al. ...................... | 362/85 |
| 2011/0255289 A1 * | 10/2011 | Krah ............................ | 362/253 |

FOREIGN PATENT DOCUMENTS

| | | |
|---|---|---|
| TW | 534344 | 5/2003 |
| TW | M246656 | 10/2004 |
| TW | M277051 | 10/2005 |
| TW | M286948 | 2/2006 |
| TW | 200712838 | 4/2007 |
| TW | M334398 | 6/2008 |

OTHER PUBLICATIONS

"Office Action of Taiwan Counterpart Application", issued on Dec. 12, 2011, p. 1-p. 7, in which the listed references were cited.

* cited by examiner

*Primary Examiner* — Lisa Lea Edmonds
(74) *Attorney, Agent, or Firm* — Jianq Chyun IP Office (57) ABSTRACT

An electronic device including a main body, a display, and a light emitting module is provided. The main body has a restrictive opening. A pivoting side of the display is pivoted to the main body. A side of the display away form the pivoting side has a latch structure protruding from a first surface of the display. The light emitting module is disposed at the latch structure. When the display is opened relative to the main body, the light emitting module emits light toward a second surface of the main body to illuminate the second surface of the main body. When the display is closed relative to the main body, the latch structure is accommodated in the restrictive opening.

9 Claims, 9 Drawing Sheets

ELECTRONIC DEVICE

CROSS-REFERENCE TO RELATED APPLICATION

This application claims the priority benefit of Taiwan application serial no. 99102096, filed on Jan. 26, 2010. The entirety of the above-mentioned patent application is hereby incorporated by reference herein and made a part of specification.

BACKGROUND OF THE INVENTION

1. Field of the Invention

The present invention generally relates to an electronic device, and more particularly, to an electronic device with an illumination function.

2. Description of Related Art

When a user uses an electronic device (for example, a notebook computer) at night or in a poorly lit place, the user may not be able to make out the keys on the keyboard and accordingly may type in wrong words or commands.

Even though a notebook computer comes with a display screen and the display screen provides some illumination while displaying images, the illumination provided by the display screen is not bright enough to lighten up the entire keyboard. Thus, the user may still input incorrect words or commands and feel very inconvenient.

SUMMARY OF THE INVENTION

Accordingly, the present invention is directed to an electronic device with an illumination function.

The present invention provides an electronic device including a main body, a display, and a light emitting module. The main body has a restrictive opening. A pivoting side of the display is pivoted to the main body. Another side of the display away from the pivoting side has a latch structure, wherein the latch structure protrudes from a first surface of the display. The light emitting module is disposed at the latch structure. When the display is opened relative to the main body, the light emitting module emits light toward a second surface of the main body to illuminate the second surface of the main body. When the display is closed relative to the main body, the latch structure is accommodated in the restrictive opening.

In the electronic device according to an embodiment of the present invention, the display includes a first casing and a display panel. The first casing has the pivoting side. The display panel is disposed in the first casing and exposed by the first surface. The main body includes a second casing and a keyboard module. One side of the second casing is pivoted to the pivoting side of the first casing. The restrictive opening is disposed at the second casing. The keyboard module is disposed at the second casing and exposed by the second surface. In addition, the electronic device may further include a lens module disposed on the first casing, wherein the lens module is located at one side away from the pivoting side.

In the electronic device according to an embodiment of the present invention, the latch structure is a protrusion. The protrusion has a latch portion, an inlay portion, and an assembly portion. The latch portion is connected with the inlay portion. The latch portion is a ring. The assembly portion is located at two opposite sides of the inlay portion. The light emitting module is installed in the inlay portion. The light emitting module includes a light source and a light guide plate. The light source is a light emitting diode (LED) disposed in the display. The light guide plate is installed in the inlay portion and protrudes from the first surface. The main body further includes a hook disposed in the restrictive opening. The hook passes through the ring to restrict the latch portion when the latch structure is accommodated in the restrictive opening. In addition, the electronic device further includes a plurality of locking elements suitable for passing through the assembly portion and being locked to the display.

As described above, when the electronic device provided by the present invention is used in a poorly lit environment, the light guide plate installed in the latch structure of the display can orient the light emitted by the light source toward the keyboard module to illuminate the main body, so that the user can use the electronic device conveniently.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
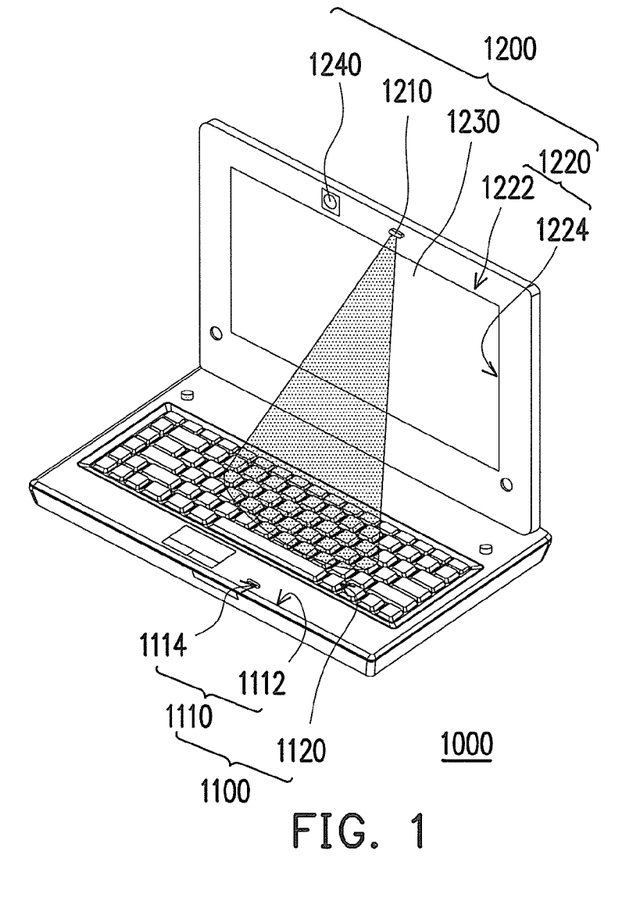
FIG. 1 is a perspective view of an electronic device according to an embodiment of the present invention.
Figure 2:
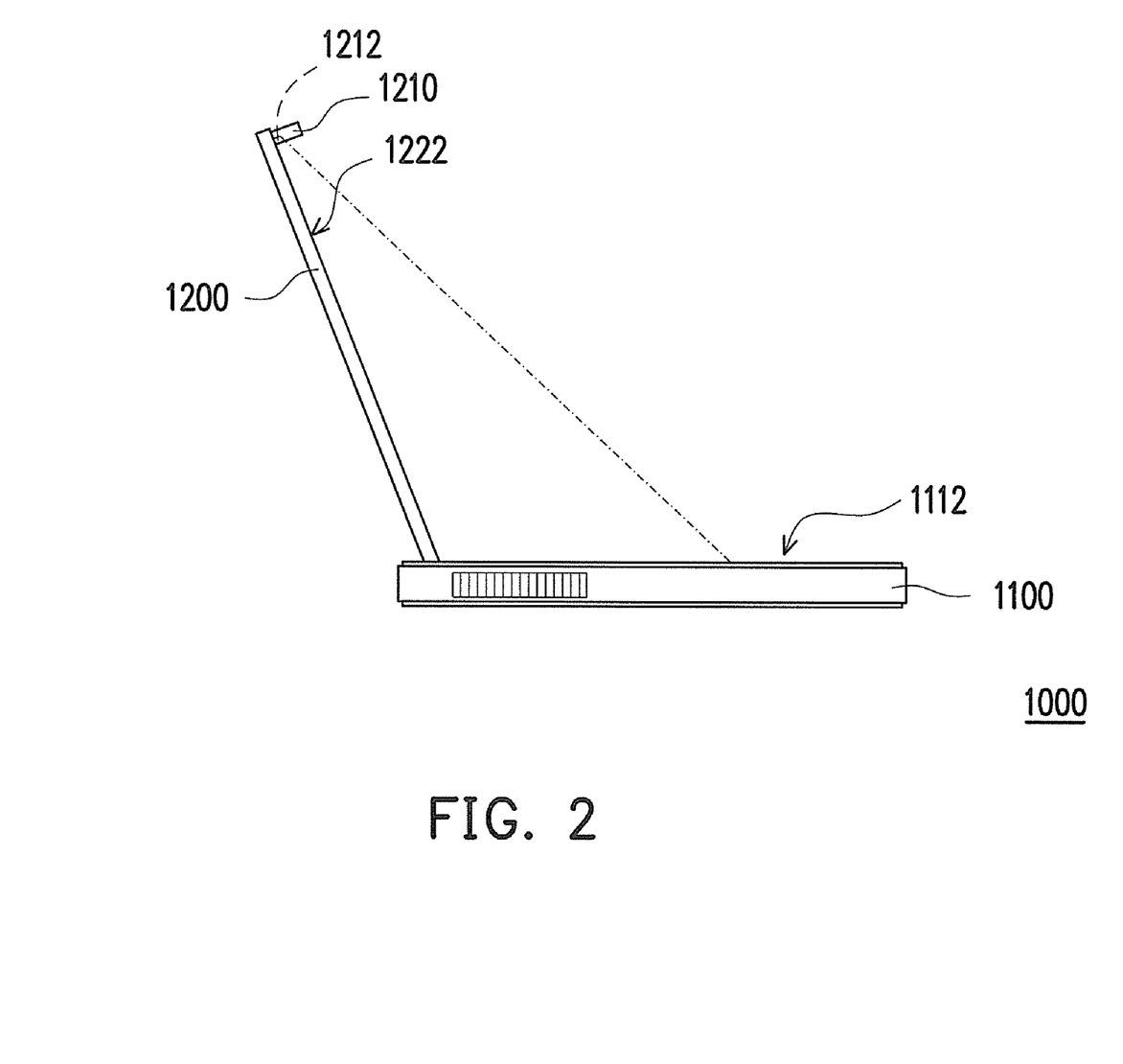
FIG. 2 is a side view of the electronic device in FIG. 1.
Figure 3:
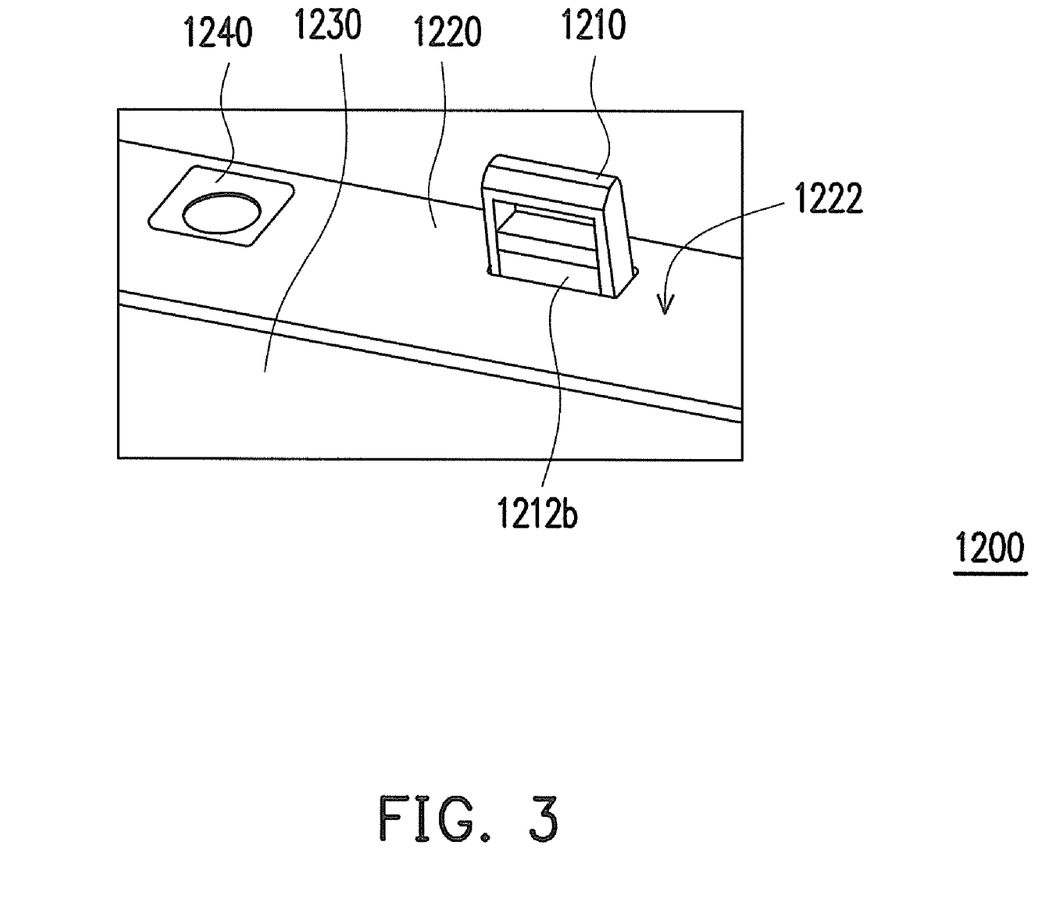
FIG. 3 is a partial view of a display in FIG. 1.

FIG. 1 is a perspective view of an electronic device according to an embodiment of the present invention. FIG. 2 is a side view of the electronic device in FIG. 1. FIG. 3 is a partial view of a display in FIG. 1. Referring to FIG. 1, FIG. 2, and FIG. 3, in the present embodiment, the electronic device 1000 is a notebook computer including a main body 1100 and a display 1200. The main body 1100 has a restrictive opening 1114. One side of the display 1200 is pivoted to the main body 1100. Another side of the display 1200 that is away from the pivoting side of the main body 1100 has a latch structure 1210, wherein the latch structure 1210 protrudes from a first surface 1222 of the display 1200. A light emitting module 1212 is disposed at the latch structure 1210.

To be specific, the display 1200 includes a first casing 1220 and a display panel 1230. The display panel 1230 is disposed in the first casing 1220, and an opening 1224 of the first surface 1222 exposes most part of the display panel 1230. The main body 1100 includes a second casing 1110 and a keyboard module 1120. One side of the second casing 1110 is pivoted to the first casing 1220. The restrictive opening 1114 is disposed at the second casing 1110. The keyboard module 1120 is disposed at the second casing 1110 and exposed by a second surface 1112. The restrictive opening 1114 and the latch structure 1210 are disposed correspondingly. In addition, the electronic device 1000 may further include a lens module 1240 disposed on the first casing 1220. The lens module 1240 is located relatively away from the pivoting side.

Figure 4:
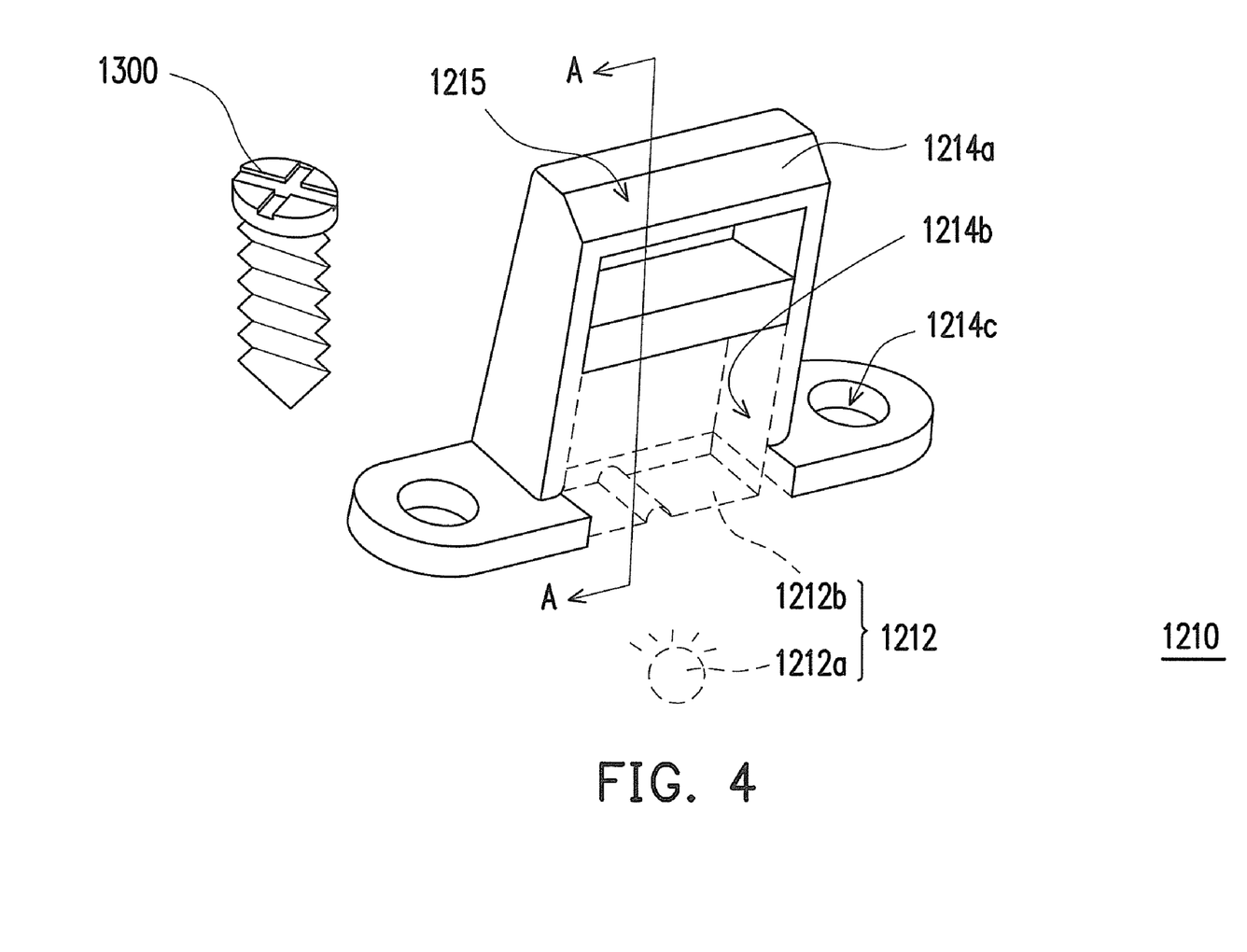
FIG. 4 is a perspective view of a latch structure.
Figure 5:
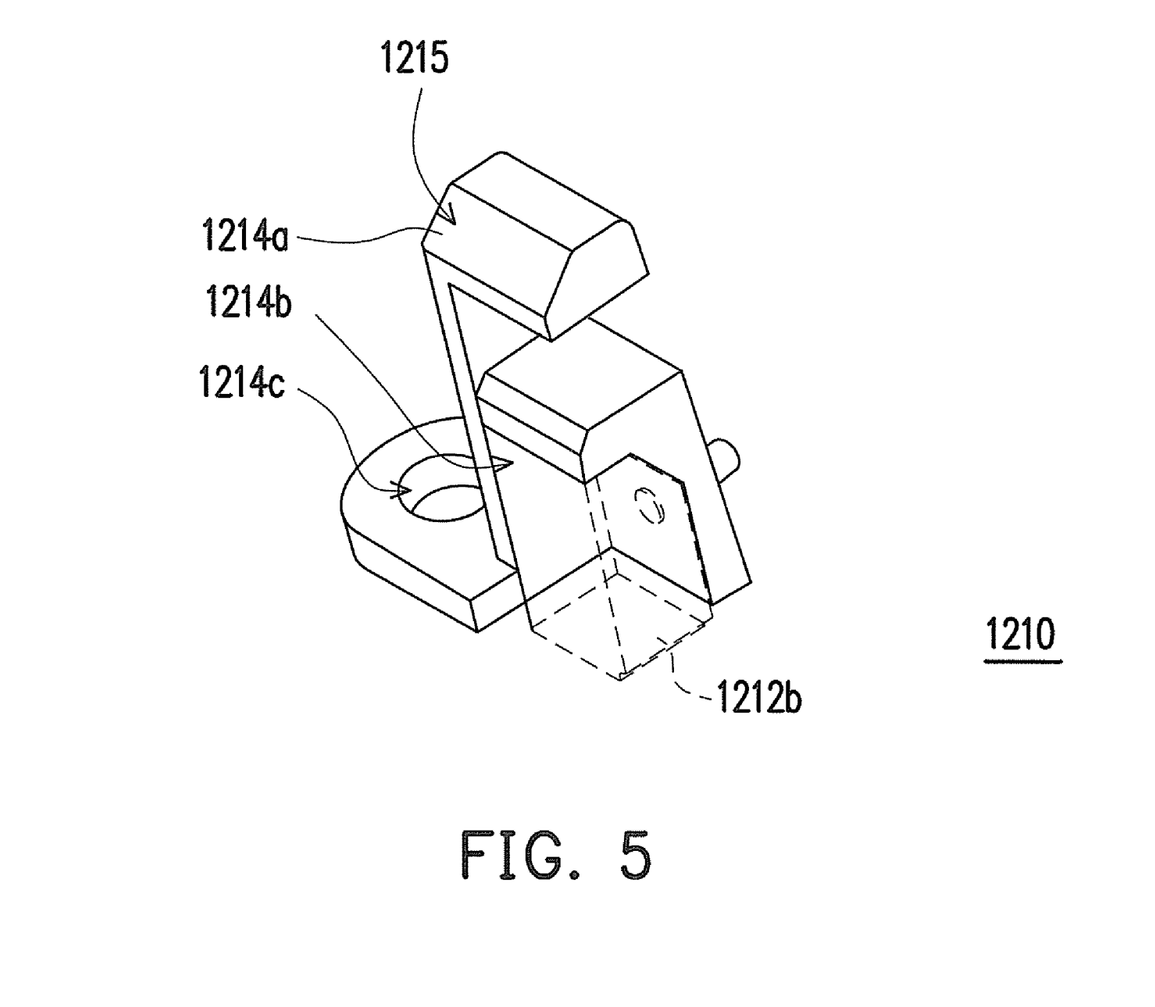
FIG. 5 is a perspective cross-sectional view of the latch structure in FIG. 4 along line A-A.

FIG. 4 is a perspective view of a latch structure. FIG. 5 is a perspective cross-sectional view of the latch structure in FIG. 4 along line A-A, wherein no light source is illustrated in FIG. 5 in order to simplify the drawing. Referring to FIG. 3, FIG. 4, and FIG. 5, in the electronic device 1000 of the present embodiment, the latch structure 1210 is a protrusion. The protrusion may be a plastic part formed through injection molding, and which has a latch portion 1214a, an inlay portion 1214b, and two assembly portions 1214c. The latch portion 1214a is connected with the inlay portion 1214b, wherein the latch portion 1214a may be a ring with a rectangular opening (not shown) such that a hook or a bump can be inserted into the ring to achieve a fastening effect. The inlay portion 1214b is a recess. The assembly portions 1214c are located at two opposite sides of the inlay portion 1214b, wherein the assembly portions 1214c may be an assembly hole. The electronic device 1000 further includes a plurality of locking elements 1300. The locking elements 1300 are suitable for passing through the assembly portions 1214c of the latch passing 1210 and being locked to the display 1200 so as to fasten the latch structure 1210 to the first casing 1220 of the display 1200.

The light emitting module 1212 includes a light source 1212a and a light guide plate 1212b. The light source 1212a may be a light emitting diode or a light bulb according to the actual requirement. The light source 1212a is disposed in the display 1200. Generally speaking, the light source 1212a may be disposed on a circuit board in the display 1200. The light guide plate 1212b is installed in the inlay portion 1214b. The light guide plate 1212b and the inlay portion 1214b may have complementary structures (for example, the light guide plate 1212b and the inlay portion 1214b are respectively a protruding pillar and an opening, and the protruding pillar is inserted into the opening) so as to steady the assembly between the light guide plate 1212b and the inlay portion 1214b. Particularly, a part of the light guide plate 1212b protrudes from the first surface 1222. The assembly between the light guide plate 1212b and the inlay portion 1214b may also be steadied through other methods (for example, by designing appropriate sizes to achieve a close fit or by using a hook).

Referring to FIG. 1, FIG. 2, and FIG. 3, when a user uses the electronic device 1000 provided by the present embodiment in a poorly lit place and opens the display 1200 relative to the main body 1100, because a part of the light guide plate 1212b of the light emitting module 1212 (illustrated in FIG. 4) protrudes from the first surface 1222, the optical path of the light emitted by the light source 1212a (referring to FIG. 4) is changed when the light passes through the light guide plate 1212b so that the light emitting module 1212 emits light toward the second surface 1112 of the main body 1100 to illuminate the second surface 1112 of the main body 1100. Thus, the user can see the character keys and function keys of the keyboard 1120 on the second surface 1112 clearly and accordingly can type in characters or commands correctly. Thereby, the electronic device 1000 in the present embodiment brings convenience to the user.

Figure 6:
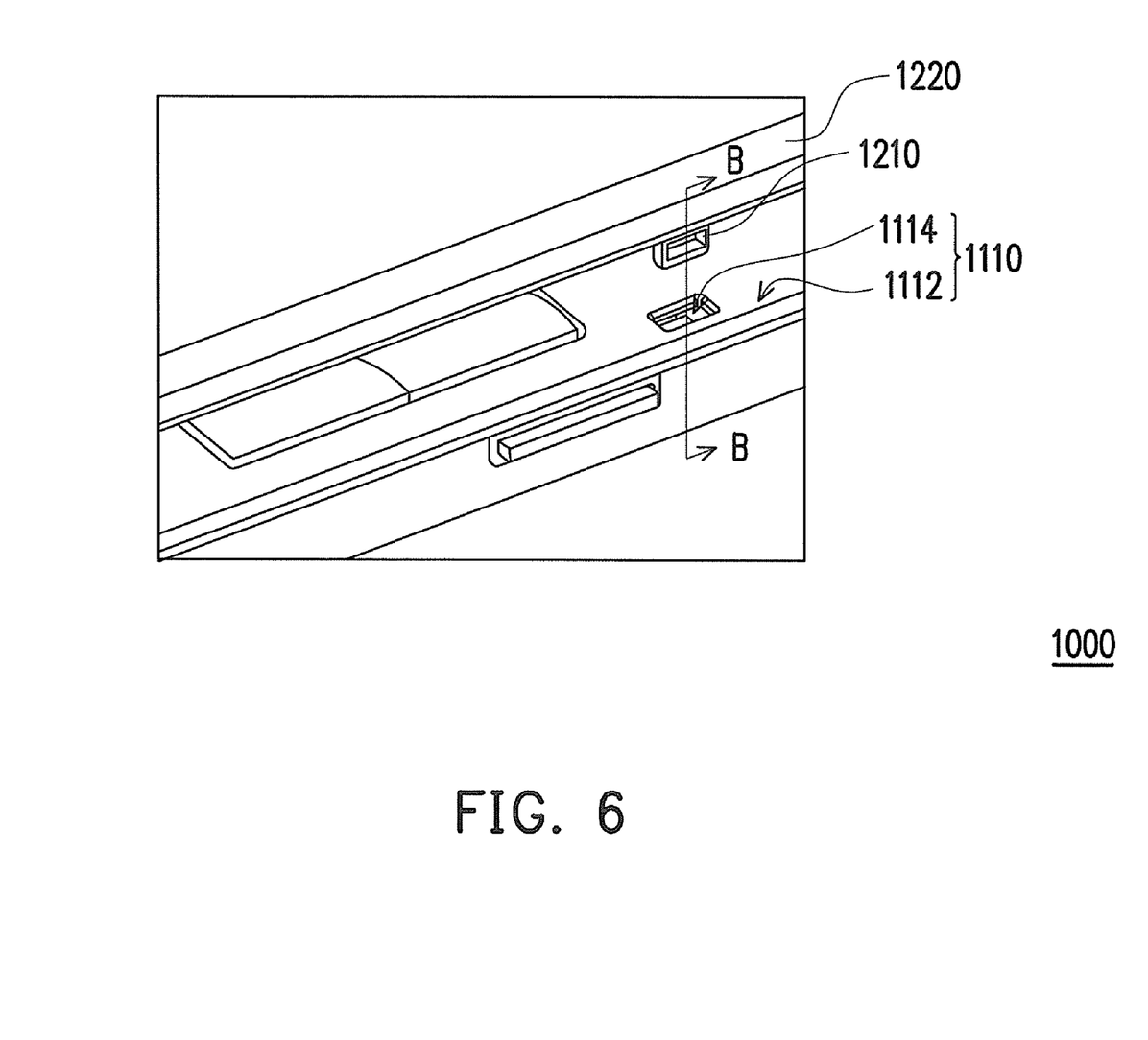
FIG. 6 is a partial view of the electronic device in FIG. 1 when the display approaches a main body.
Figure 7:
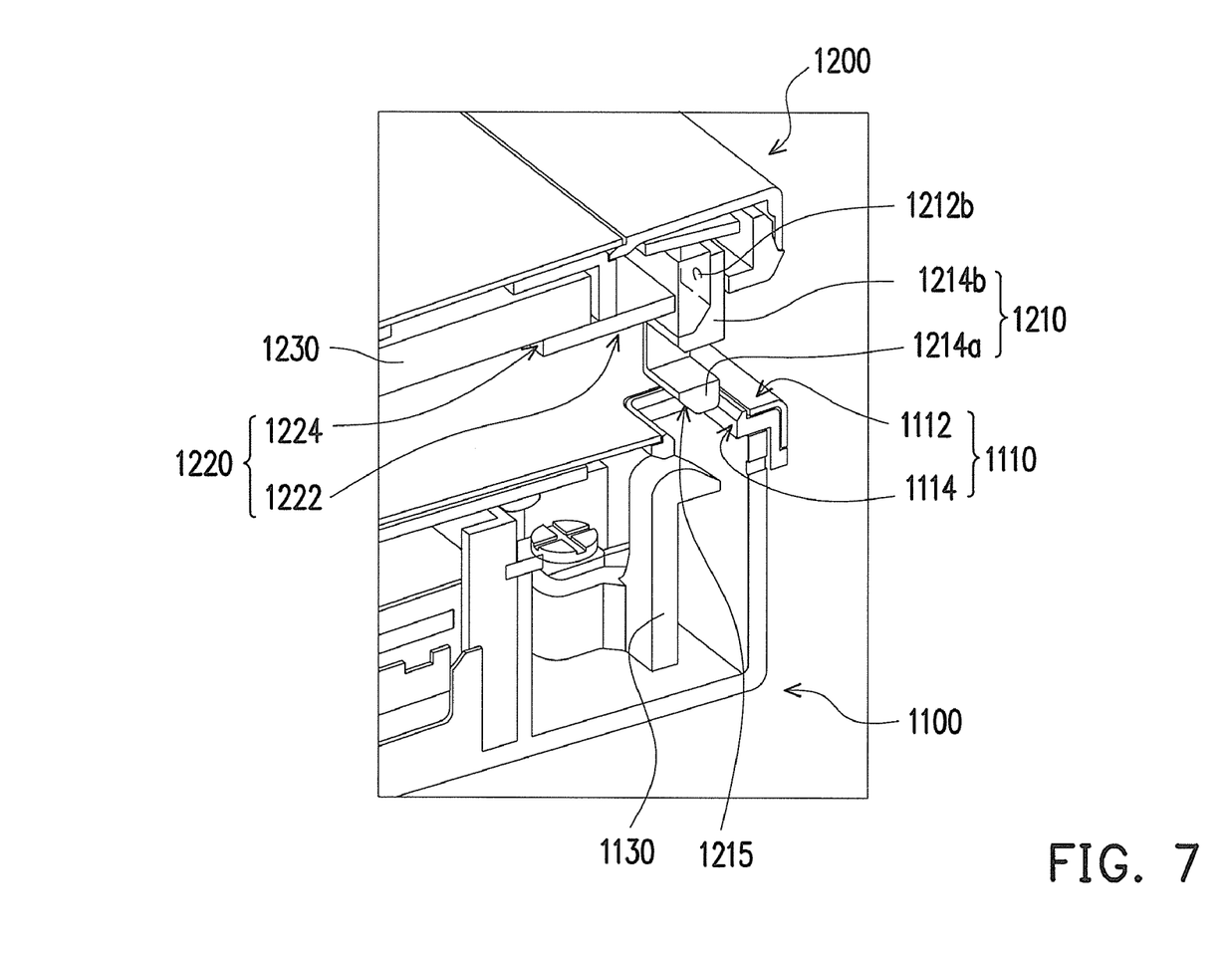
FIG. 7 is a perspective cross-sectional view of the part illustrated in FIG. 6 along line B-B.

FIG. 6 is a partial view of the electronic device in FIG. 1 when the display approaches the main body. FIG. 7 is a perspective cross-sectional view of the part illustrated in FIG. 6 along line B-B. Referring to FIG. 6 and FIG. 7, as described above, the main body 1100 further includes a hook 1130 disposed in the restrictive opening 1114. When the display 1200 is closed relative to the main body 1100, the latch structure 1210 is accommodated in the restrictive opening 1114, and the hook 1130 passes through the opening of the latch portion 1214a to restrict the latch structure 1210. The interaction and fastening between the latch structure 1210 and the hook 1130 when the display 1200 is closed relative to the main body 1100 will be described in detail below.

Figure 8:
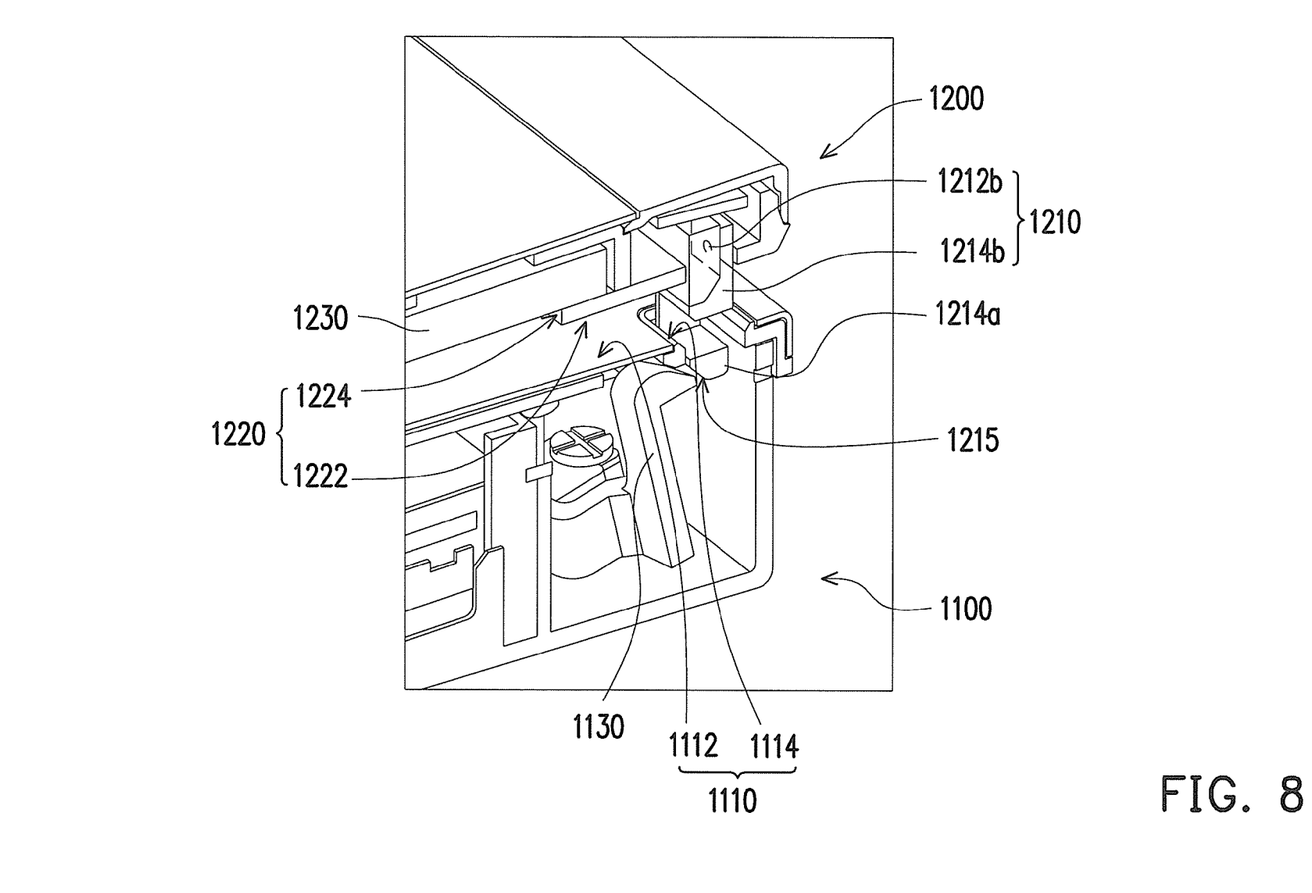
FIG. 8 and FIG. 9 illustrate the interaction between a protrusion of a latch structure and a hook when a display is closed relative to a main body.
Figure 9:
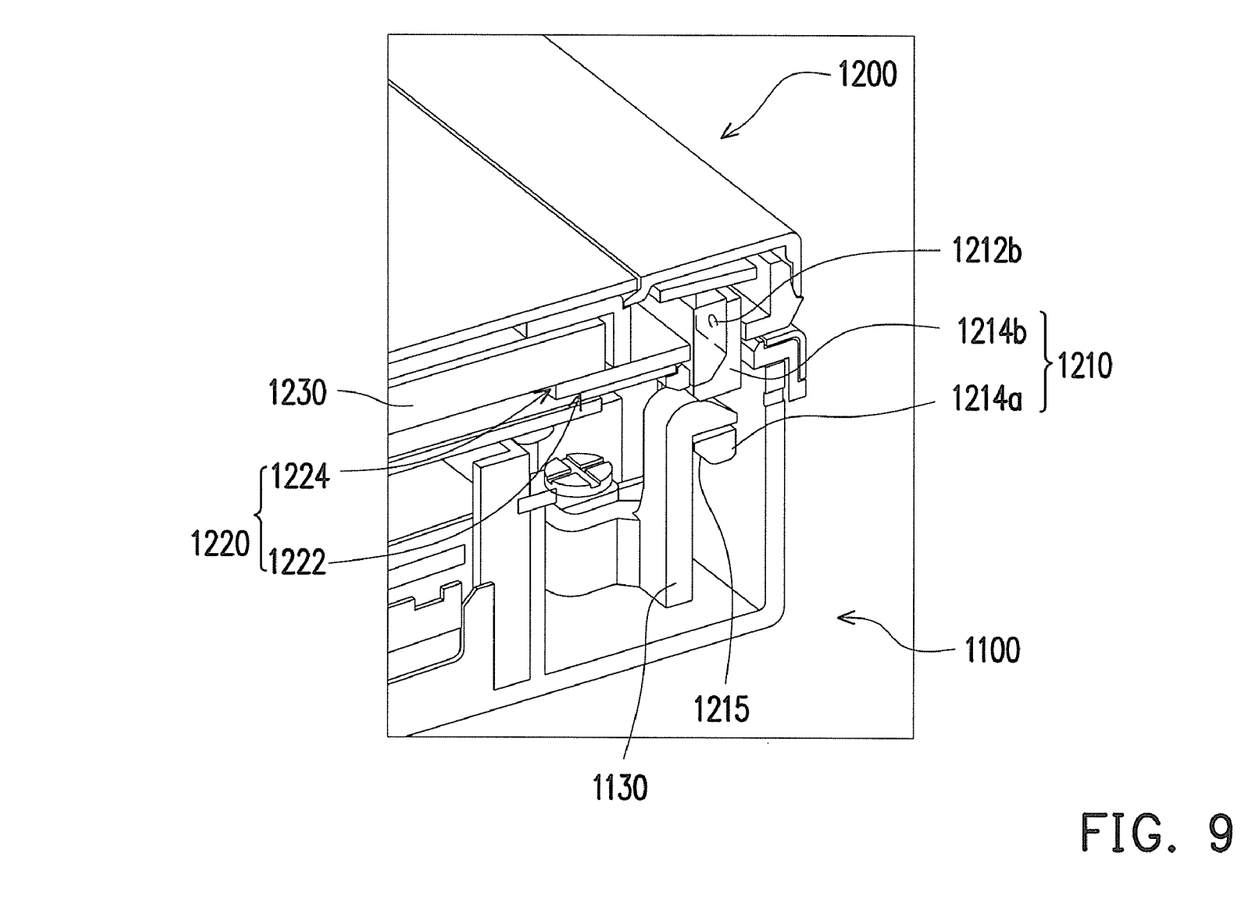

FIG. 8 and FIG. 9 illustrate the interaction between a protrusion of a latch structure and a hook when a display is closed relative to a main body. Referring to FIG. 7, FIG. 8, and FIG. 9 in sequence, the latch portion 1214a may further have a guide surface 1215. When the display 1200 approaches the main body 1100 to be closed, the latch portion 1214a of the latch structure 1210 first enters the restrictive opening 1114 and contacts the hook 1130. Along with the advance of the latch structure 1210, the hook 1130 is guided by the guide surface 1215 of the latch portion 1214a to move backwards. When the hook 1130 is released from the guide surface 1215, it is locked into the opening (not shown) of the latch portion 1214a to restrict the latch structure 1210.

As described above, the light emitting module 1212 is disposed on the latch structure 1210 of the display 1200. Thus, it not needed to drill a hole on the first casing 1220 of the display 1200 or use other devices additionally to dispose the light emitting module 1212, so that a complete appearance of the first casing 1220 is achieved and the cost of the electronic device 1000 is reduced.

In addition, even though the light emitting module in the present embodiment is implemented with a light source and a light guide plate, those skilled in the art can change the structure of the light emitting module in consideration of other factors, such as the cost or the actual requirement. For example, a light source (for example, a light bulb or a LED) is directly installed on the inlay portion 1214b, and the light output surface of the light source is oriented toward the second surface 1112 of the second casing 1110 of the main body 1100, so that the second surface 1112 can be illuminated to allow the user to recognize keys on the keyboard without the light guide plate and accordingly the fabricating cost can be reduced.

As described above, the electronic device provided by the present invention has a light emitting module that can illuminate the keyboard module. Thus, it is bright enough for a user to recognize keys on the keyboard module when the user uses the electronic device in a poorly lit environment, so that the user can input characters or commands correctly. Thereby, as to the user, using the electronic device is made more convenient. In addition, the light emitting module is disposed at a protrusion of a latch structure so that it is not needed to drill any hole on the casing of the display or use any other device for disposing the light emitting module. Thereby, a complete appearance of the casing is achieved and the fabrication cost is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a main body, having a restrictive opening;
   a display, wherein a pivoting side of the display is pivoted to the main body, a side of the display away from the pivoting side has a latch structure, and the latch structure protrudes from a first surface of the display; and a light emitting module, disposed at the latch structure, wherein the latch structure is a protrusion having a latch portion, an inlay portion, and an assembly portion, the latch portion is connected with the inlay portion, the assembly portion is located at two opposite sides of the inlay portion, and the light emitting module is installed in the inlay portion, when the display is opened relative to the main body, the light emitting module emits light toward a second surface of the main body to illuminate the second surface of the main body, and when the display is closed relative to the main body, the latch structure is accommodated in the restrictive opening.

2. The electronic device according to claim 1, wherein the display comprises:
   a first casing, having the pivoting side; and
   a display panel, disposed in the first casing and exposed by the first surface.

3. The electronic device according to claim 2, wherein the main body comprises:
   a second casing, wherein a side of the second casing is pivoted to the pivoting side of the first casing, and the restrictive opening is disposed at the second casing; and
   a keyboard module, disposed at the second casing and exposed by the second surface.

4. The electronic device according to claim 3 further comprising a lens module disposed on the first casing and at a side away from the pivoting side.

5. The electronic device according to claim 1, wherein the light emitting module comprises:
   a light source, disposed in the display; and
   a light guide plate, disposed in the inlay portion of the latch structure, and protruding from the first surface.

6. The electronic device according to claim 5, wherein the light source is a light emitting diode (LED).

7. The electronic device according to claim 1, wherein the latch portion is a ring.

8. The electronic device according to claim 7, wherein the main body further comprises a hook disposed in the restrictive opening, and when the latch structure is accommodated in the restrictive opening, the hook passes through the ring to restrict the latch portion.

9. The electronic device according to claim 1 further comprising a plurality of locking elements, wherein the locking elements pass through the assembly portion and are locked to the display.

* * * * *